United States Patent [19]
Mosby

[11] Patent Number: 5,193,576
[45] Date of Patent: Mar. 16, 1993

[54] PRESSURE REGULATOR

[75] Inventor: Geoffrey R. Mosby, Sutton Coldfield, England

[73] Assignee: Lucas Industries public limited company, Solihull, England

[21] Appl. No.: 918,965

[22] Filed: Jul. 24, 1992

[30] Foreign Application Priority Data

Jul. 25, 1991 [GB] United Kingdom ............... 9116078

[51] Int. Cl.$^5$ ..................... F16K 17/04; F16K 25/00
[52] U.S. Cl. ..................................... 137/510; 251/84
[58] Field of Search ................. 137/510; 251/86, 84; 123/463, 464, 447, 457

[56] References Cited

U.S. PATENT DOCUMENTS

| | | | |
|---|---|---|---|
| 1,409,127 | 3/1922 | Wasem | 251/86 |
| 1,860,450 | 5/1932 | Campbell | 137/510 |
| 1,991,621 | 2/1935 | Noll | 251/84 X |
| 2,069,069 | 1/1937 | Horton | 251/86 X |
| 3,326,512 | 6/1967 | Clarke | 251/86 |
| 3,511,270 | 5/1970 | Fehrenbach et al. | 251/86 X |
| 4,450,859 | 5/1984 | Bergman | 251/84 X |
| 4,627,463 | 12/1986 | Johnstone | 251/84 X |
| 4,759,331 | 7/1988 | Sausner | 251/84 X |

Primary Examiner—Stephen M. Hepperle
Attorney, Agent, or Firm—Jenner & Block

[57] ABSTRACT

A pressure regulator comprises a housing internally divided by a diaphragm, the diaphragm carrying a valve closure ball engageable with a valve seat forming part of an outlet from the housing. The ball is located within a ball carrier which is attached to the diaphragm, the ball being retained in the carrier by a ball retainer which comprises an annular disc and engagement means for receiving an end portion of the ball carrier, the ball and the retainer being capable of limited lateral movement with respect to the direction of movement of the diaphragm.

8 Claims, 1 Drawing Sheet

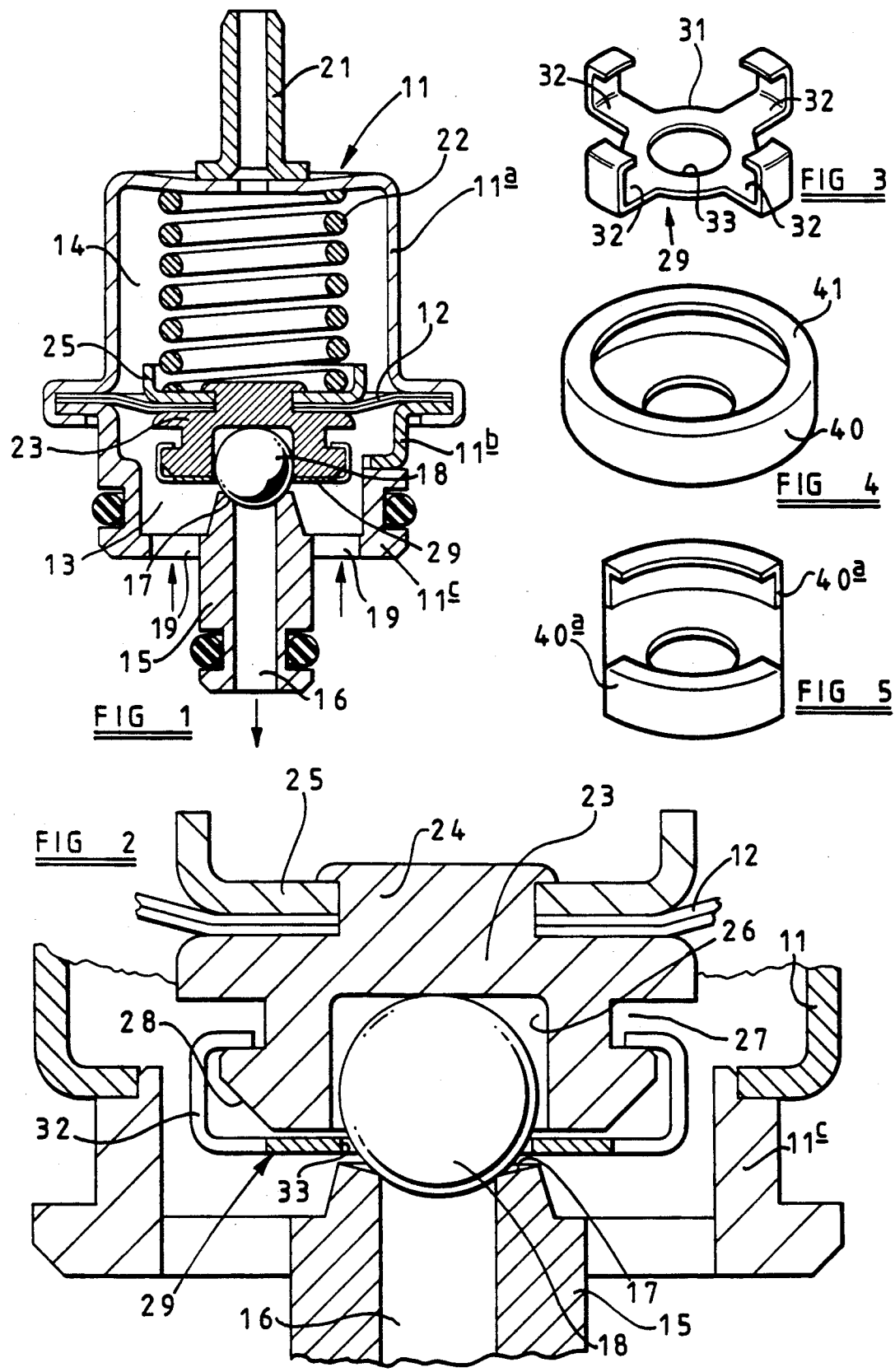

PRESSURE REGULATOR

This invention relates to a fluid pressure regulator particularly, but not exclusively, for use in regulating fuel pressure in an internal combustion engine fuel injection system.

A known fuel pressure regulator includes a housing divided internally by a flexible diaphragm to define first and second chambers. The first chamber is provided with a fuel inlet and a fuel outlet and flow of fuel from the inlet through the first chamber to the outlet is controlled by a valve. The fuel outlet of the first chamber includes a valve seat against which a valve closure member in the form of a ball can be pressed to close the outlet. The ball is carried by the diaphragm and within the second chamber a compression spring acts between the wall of the housing and the diaphragm to urge the diaphragm, and thus the ball, towards a valve closed position. The second chamber is provided with a vacuum connection whereby the air pressure within the second chamber can be varied, for example in accordance with the manifold depression of the internal combustion engine with which the regulator is associated.

The valve opening and closing movement requires movement of the ball in a direction axial of the regulator, this direction being at right angles to the plane of the diaphragm. A recognised problem in manufacturing such regulators is alignment of the ball with the valve seat in a direction transverse to the regulator axis (parallel to the diaphragm plane). It is known to use a ball carrier supported by the diaphragm and having therein a recess within which the ball can "float" in a direction transverse to the regulator axis. Some method is then needed to retain the ball axially so that the ball does not become dislocated from the carrier when the diaphragm is moved under the action of fuel pressure against the compression spring to open the valve. European Patent 0198381 illustrates such an arrangement wherein in order to effect control over the axial position of the ball there is provided a relatively complex sliding closure arrangement which holds the ball in the carrier and a compression spring within the carrier which urges the ball against the closure arrangement. Naturally such a mechanically complex solution is both expensive and relatively difficult to engineer given the close tolerances which must be observed. It is an object of the present invention to provide a pressure regulator wherein these difficulties are obviated in a simple and convenient manner.

In accordance with the present invention there is provided a pressure regulator comprising a housing divided internally by a diaphragm to form first and second chambers, inlet and outlet passages in the wall of the first chamber, a valve seat forming part of the outlet passage of the first chamber, a valve closure ball engageable with the seat to close the outlet, a ball carrier moveable with the diaphragm and having therein a recess within which the ball is received with freedom for limited lateral movement relative to the direction of movement of the diaphragm and carrier, and, a ball retainer engaged with the ball carrier to retain the ball relative to the carrier, the ball retainer comprising an annular disc lying across the valve seat end of the carrier through which the ball protrudes to engage the valve seat in use, and engagement means extending externally of the carrier and defining a re-entrant recess within which the valve seat end portion of the carrier is received, the retainer being capable of limited movement in any direction laterally with respect to the direction of movement of the diaphragm and carrier.

Preferably the ball retainer comprises an annular element and two or more legs integral therewith extending transverse to the plane of the element, said legs extending inwardly at their free ends to engage in a circumferential groove in the outer surface of the carrier.

Preferably the ball retainer is preformed and is engaged with the carrier as a snap-fit.

The invention will further be described by way of example with reference to the accompanying drawings, in which:

FIG. 1 is a transverse cross-sectional view of a fuel pressure regulator,

FIG. 2 is an enlargement of part of FIG. 1,

FIG. 3 is a perspective view of a ball retainer illustrated in section in FIGS. 1 and 2, and FIGS. 4 and 5 are both perspective views of alternative ball retainers.

Referring to FIGS. 1 and 2, the fuel pressure regulator includes a housing 11 formed in three parts 11a, 11b, 11c the parts 11a and 11b being oppositely directed cup-shaped metal pressings having peripheral flanges which are interconnected by one being rolled over the other to trap therebetween a flexible diaphragm 12 dividing the housing to form first and second chambers 13, 14. The third housing part 11c is welded to the opposite end of the housing part 11b from the housing part 11a and includes a cylindrical boss providing a mounting for the regulator and an outlet spigot 15 having an outlet passage 16 extending therethrough.

Within the chamber 13 the innermost end of the spigot 15 defines a frusto-conical valve seat 17 against which a valve closure member in the form of a steel ball 18 can seat to close the outlet passage 16. Radially outwardly from the centrally disposed spigot 15, the lower wall of the housing part 11c is formed with four arcuate slots 19 defining inlets for the chamber 13.

The wall of the housing part 11a is formed with a hollow spigot 21 defining a vacuum connection communicating with the chamber 14. A compression spring 22 within the chamber 14 acts between the closed end of the housing part 11a and the diaphragm 12 to urge the diaphragm 12 to deflect towards the valve seat 17.

Movement of the diaphragm 12 is transmitted to the ball 18 by means of a ball carrier 23 carried by the diaphragm 12. The carrier 23 is circular in transverse cross-section and includes a planar top surface engaging the lower surface of the diaphragm 12. A centrally disposed post 24 integral with the remainder of the carrier 23 extends from the top surface through a centrally disposed aperture in the diaphragm 12 and through the base of a shallow metal cup 25 and is rolled over or otherwise deformed at its free end to engage the inner surface of the base of the cup 25. Thus a central region of the diaphragm 12 is firmly trapped between the upper surface of the carrier 23 and the lower surface of the cup 25 and a seal is produced at this point. The cup 25 acts as a location for the diaphragm end of the spring 22 and also acts to spread the load of the spring across an area of the diaphragm. The portion of the carrier body extending downwardly from the diaphragm 12 towards the seat 17 is formed with a centrally disposed recess 26 of larger diameter than the ball 18 but of a depth (measured in a direction axially of the regulator) equal to approximately two thirds the diameter of the ball 18. The outer surface of the downwardly projecting portion of the carrier body 23 is formed, approximately mid-way between its free end and the diaphragm 12, with a radially directed, circumferentially extending groove 27 of rectangular cross-section. The free end region of the body 23 is chamfered at 28 so as to be of frusto-conical form.

It will be recognised that in the absence of a contrary balance of pressures between the chambers 13 and 14 the spring 22 will deflect the diaphragm towards the valve seat 17 so that the ball 18 received within the recess 26 of the carrier 23 will engage the seat 17 so closing the outlet 16 of the chamber 13. When the balance of pressures in the chambers 13 and 14 overcomes the loading imposed by the spring 22 then the diaphragm 12 will move against the action of the spring 22 and the ball 18 will be free to move away from the seat 17. In order that the ball 18 moves with the carrier 23 and does not become dislocated from the recess 26 when the diaphragm is moved against the action of the spring 22 there is provided a ball retainer 29 engaged with the free end region of the carrier 23 within the chamber 13. The ball retainer 29 comprises a steel, conveniently spring steel, pressing including an annular disc 31 with four equi-angularly spaced integral radially outwardly extending legs 32. At a point outwardly from the periphery of the disc 31 the legs 32 are bent at right angles so as to extend transverse to the plane of the disc, and the upstanding portion of each leg 32 is then bent inwardly at right angles so that each leg 32 is generally C-shape in cross-section. The diameter of the central aperture 33 in the disc 31 is less than the diameter of the ball 18 and the spacing between the parallel regions of diametrically opposite legs 32 is greater than the maximum diameter of the frusto-conical free end region of the carrier body 23. The ball retainer 29 is engaged with the carrier body 23 such that the disc 31 lies across the open end of the recess 26 and the legs 32 extend externally of the frusto-conical region of the body 23, the inturned portions at the free ends of the legs engaging within the groove 27 so that the retainer 29 is retained in engagement with the carrier body 23, but can move relative thereto transverse to the axis of movement of the diaphragm 12.

It will be recognised therefore that the retainer 29 prevents dislocation of the ball 18 but, by virtue of its freedom for lateral movement relative to the body 23, does not restrict lateral movement of the ball 18 within the recess 26. The ball 18 can thus move laterally with respect to the body 23 and the diaphragm 12 through a limited extent and can self-centre on the valve seat 17. Thus if, during assembly of the pressure regulator, there is axial misalignment between the spigot 15 and the carrier-diaphragm sub-assembly the ball 18 can nevertheless centre on the seat 17 as is necessary to ensure effective sealing of the outlet in the valve closed position.

When in use in one particular form of internal combustion engine fuel injection system the vacuum spigot 21 of the chamber 14 will be connected to the inlet manifold of the internal combustion engine and thus the chamber 14 will be subjected to the air pressure conditions in the inlet manifold. The cylindrical outer surface of the housing part 11c is sealingly engaged in a cylindrical aperture in the wall of a fuel rail of the fuel injection system, the fuel rail comprising a pipe or hollow body the interior of which is supplied with fuel under pressure from the fuel pump of the fuel system. The spigot 15 similarly sealingly engages a drain conduit which extends through the fuel rail back to the fuel tank, or the inlet side of the fuel pump. It will be recognised that the outer surface of the housing part 11c and the outer part of the spigot 15 are provided with grooves receiving O-ring seals to effect the necessary sealing.

The pressure regulator serves to maintain the fuel pressure in the fuel rail relatively constant with respect to the air pressure in the inlet manifold. If the fuel pressure in the fuel rail and thus the fuel pressure within the chamber 15, relative to the air pressure within the manifold and chamber 14, falls below a desired "regulated" value, the diaphragm 12 will be flexed towards the seat 17 thus engaging the ball 18 on the seat 17 and closing the outlet passage 16. As the differential pressure between chambers 13 and 14, taking the action of the spring 22 into account, approaches the "regulated" value, the diaphragm 12 is flexed in a direction away from the seat 17 and thus the ball is moved off the seat slightly, allowing fuel to spill through the outlet passage 16 maintaining the fuel pressure in chamber 15 and the fuel rail, at a relatively constant value with respect to manifold pressure. A further increase in fuel supply pressure, or decrease in manifold pressure, will flex the diaphragm 12 further from the seat 17 increasing the opening of the outlet and allowing more fuel to spill through the outlet passage 16 so maintaining the desired pressure in the fuel rail.

It will be recognised that the chamfer 28 of the frusto-conical end region of the carrier body 23 together with the resilient nature of the material of the retainer 29 permits the retainer 29 to be preformed to its final shape, and then to be engaged with the body 23 as a snap-fit, the free ends of the inturned portions of the legs 32 riding on the chamfer 28 during engagement of the retainer with the carrier body so that the legs 32 are initially flexed outwardly, and then spring back to engage the inturned portions of the legs in the groove 27. Although the use of four equi-angularly spaced legs 32 on the retainer 29 is preferred, it is to be understood that the legs need not necessary be equi-angularly spaced, and that a version could be produced with three legs, or more than four legs. Moreover, while it is preferred to preform the retainer 29 to its finished shape and to engage it as a snap-fit with the body 23 it is to be understood that the inturned part or parts of the retainer 29 which engage within the groove 27 could be deformed into the groove 27 as the final step in the formation of the retainer 29.

In the embodiment shown in FIG. 4, the legs 32 are replaced by a cylindrical upstanding wall 40 integral with the disc 31, the upper, free-edge 41 of the wall 40 being turned inwardly, as a final step in the construction of the retainer, to lie within the groove 27. The retainer shown in FIG. 5 is similar to that of FIG. 4 but has two diametrically opposed, part-cylindrical legs 40a rather than a continuous cylindrical wall. It will be recognised that the ball retainers of FIGS. 4 and 5 will only take on the illustrated form when attached to a ball carrier.

In the arrangements illustrated the diameter of the central aperture 33 of the disc 31 of the retainer is such that the ball 18 does not engage the periphery of the aperture 33 when the ball is seated against the base of the recess 26. In a modification the diameter of the aperture 33 is reduced such than the periphery of the aperture does engage the ball 18, and the disc 31 is very slightly flexed when the ball 18 is seated against the base of the recess 26. In this arrangement it will be recognised that the flexure of the carrier 29 lightly urges the ball 18 against the base of the recess 26 and thus restricts the freedom of movement of the ball 18 relative to the carrier body 23 in an axial direction so preventing chattering of the ball 18 against the seat 17 during disengagement of the ball from the valve seat 17. However, the freedom for lateral movement of the ball 18 and retainer 29 relative to the carrier body 23 is not impaired, the self-centring of the ball 18 on the seat 17 being maintained.

The slight differences in shape of the body parts 11b and 11c between FIGS. 1 and 2 are not significant and have no bearing upon the invention.

I claim:

1. A pressure regulator comprising a housing divided internally by a diaphragm to form first and second chambers, inlet and outlet passages in the wall of the first chamber, a valve seat forming part of the outlet passage of the first chamber, a valve closure ball engageable with the seat to close the outlet passage, a ball carrier moveable with the diaphragm and having therein a recess within which the ball is received with freedom for limited lateral movement relative to the direction of movement of the diaphragm and carrier, and a ball retainer engaged with the ball carrier to retain the ball relative to the carrier, said ball retainer comprises an annular disc lying across the valve seat end of the carrier and through which the ball protrudes to engage the valve seat in use, and engagement means extending externally of the carrier and defining a re-entrant recess within which the valve seat end portion of the carrier is received, the retainer being capable of limited movement in any direction laterally with respect to the direction of movement of the diaphragm and carrier.

2. A pressure regulator as claimed in claim 1 wherein the ball retainer comprises an annular element and two or more legs integral therewith extending transverse to the plane of the annular element, said legs extending inwardly at their free ends to engage in a circumferential groove in the outer surface of the carrier.

3. A pressure regulator as claimed in claim 2 wherein the ball retainer is provided with four legs.

4. A pressure regulator as claimed in claim 2 or claim 3 wherein the legs are equi-angularly spaced around the annular element.

5. A pressure regulator as claimed in claim 1 wherein the ball retainer is preformed and is engaged with the carrier as a snap-fit.

6. A pressure regulator as claimed in claim 1 wherein the ball retainer is a spring steel pressing.

7. A pressure regulator as claimed in claim 1 wherein the ball retainer comprises an annular disc provided with an integral upstanding circumferential wall, the free edge of which is turned inwardly to engage a groove in the outer surface of the carrier.

8. A pressure regulator as claimed in claim 1 wherein, in use, the ball is trapped between and engages with both the carrier and the ball retainer, the ball retainer being slightly flexed by its engagement with the ball.

* * * * *